Nov. 23, 1965         W. H. BUNTING ETAL         3,219,135
                    AIR CUSHION VEHICLE SKIRT
Filed July 19, 1962                          3 Sheets-Sheet 1

INVENTORS
WILFRED HENRY BUNTING
NORMAN HENRY WYATT
BERNARD CAIGER
BY
ATTORNEYS

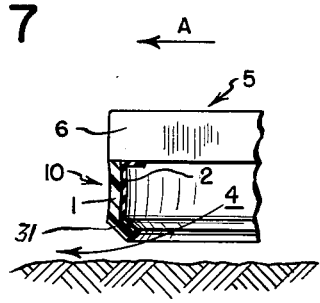
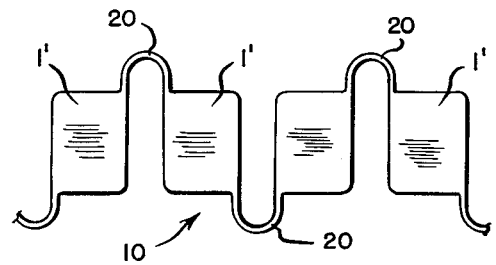
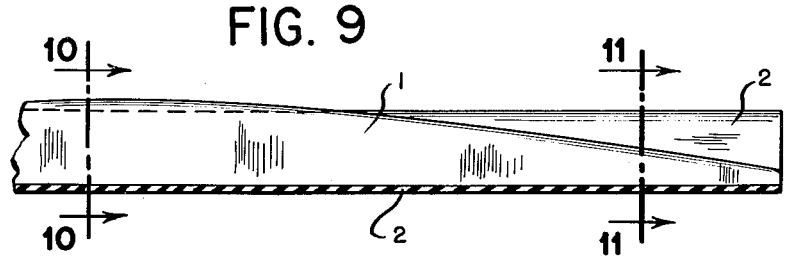
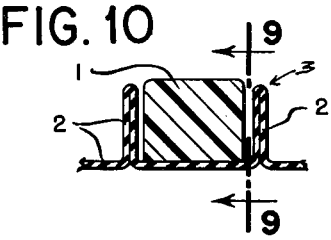
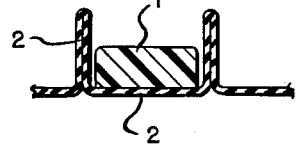
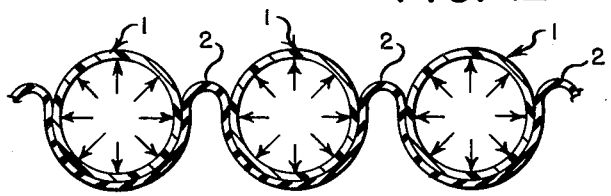

Nov. 23, 1965   W. H. BUNTING ETAL   3,219,135
AIR CUSHION VEHICLE SKIRT
Filed July 19, 1962   3 Sheets-Sheet 3

INVENTORS
WILFRED HENRY BUNTING
NORMAN HENRY WYATT
BERNARD CAIGER
BY
ATTORNEYS

United States Patent Office 3,219,135
Patented Nov. 23, 1965

3,219,135
AIR CUSHION VEHICLE SKIRT
Wilfred Henry Bunting, Farringdon, Norman Henry Wyatt, Highworth, and Bernard Caiger, Swindon, England, assignors to Vickers-Armstrongs (Engineers) Limited, London, England, a British company
Filed July 19, 1962, Ser. No. 211,013
Claims priority, application Great Britain, July 24, 1961, 26,726/61; Dec. 22, 1961, 46,081/61
10 Claims. (Cl. 180—7)

This invention relates to vehicles.

According to the present invention there is provided a vehicle adapted to ride on an air cushion which is encircled by a skirt depending from the underside of the peripheral part of the vehicle, wherein the skirt comprises a plurality of discrete first flexible members depending from the underside of the peripheral part of the vehicle, adjacent first members being effectively joined together by a second flexible member of less stiffness than said first members, the arrangement being such that the skirt is continuous around said peripheral part and such that in the natural condition of the skirt there is an upright fold in the second member between each adjacent pair of first members.

For a better understanding of the invention and to show how the same may be carried into effect reference will now be made, by way of example, to the accompanying drawings in which.

Figure 5:
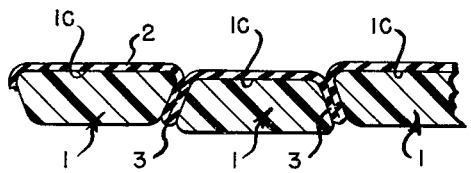
Figure 3:
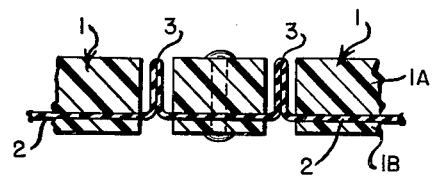
FIGURE 3 is a diagrammatic sectional plan view of part of a skirt of a vehicle adapted to ride on an air cushion.
Figure 6:
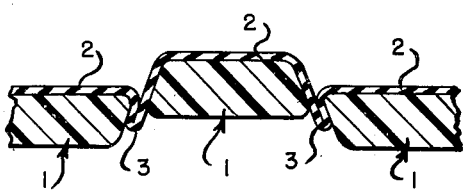
Figure 4:
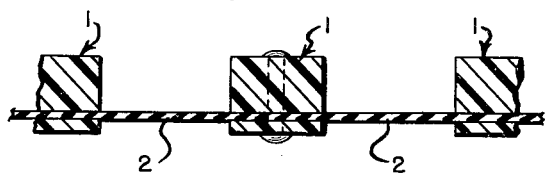
Figure 13:
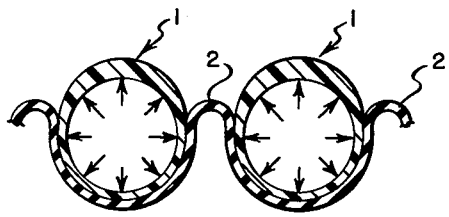
Figure 14:
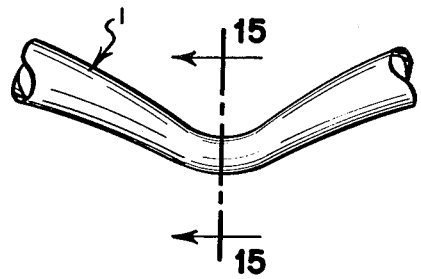
Figure 15:
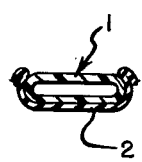
Figure 16:
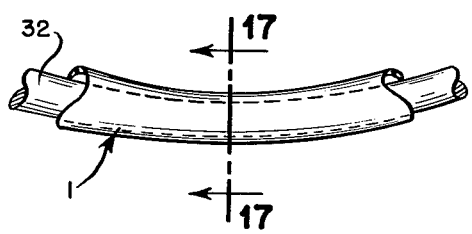
Figure 17:
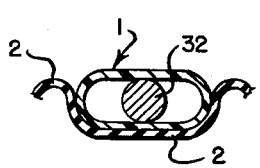

FIGURE 4 is a diagrammatic sectional plan view of part of the skirt of FIGURE 3 when in an expanded condition, FIGURE 5 is a diagrammatic sectional plan view of part of another skirt of a vehicle adapted to ride on an air cushion, FIGURE 6 is a diagrammatic sectional plan view of the skirt of FIGURE 5 when in an expanded condition, FIGURE 7 is a broken diagrammatic elevational view of a portion of another air cushion borne vehicle in which the skirt is shown in section;

FIGURE 8 is a diagrammatic plan view showing the top of a portion of a further modified form of skirt for an air cushion borne vehicle;

FIGURE 9 is a longitudinal sectional view of a part of a further skirt modification for an air cushion borne vehicle taken on the line 9—9 of FIGURE 10;

FIGURES 10 and 11 are sectional views taken respectively on the lines 10—10 and 11—11 of FIGURE 9;

FIGURES 12 and 13 are diagrammatic sectional plan views of parts of two further skirt modifications;

FIGURE 14 is a broken diagrammatic view of a member 1 of a skirt like the members 1 shown in FIGURE 12, but in a buckled condition;

FIGURE 15 is a sectional view taken on the line 15—15 of FIGURE 14, and including a showing of the member 2;

FIGURE 16 is a broken view illustrating a modified form of a portion of the skirt shown in FIGURE 12; and FIGURE 17 is a sectional view taken on the line 17—17 of FIGURE 16 showing the hollow member 1 and also the member 2 to which it is attached.

Each of the three skirts of FIGURES 1 to 6 is fitted around the peripheral part of the underside of a vehicle 5 that is adapted to ride on an air cushion 4. Such a vehicle may either be any one of those known under the registered trademark "Hovercraft," or a "plenum" chamber type air cushion borne vehicle. In each case the skirt encircles the cushion on which the vehicle rides, the top of the skirt being attached to the underside of the vehicle and the bottom of the skirt being just clear of the ground when the vehicle is riding on its cushion.

Figure 1:
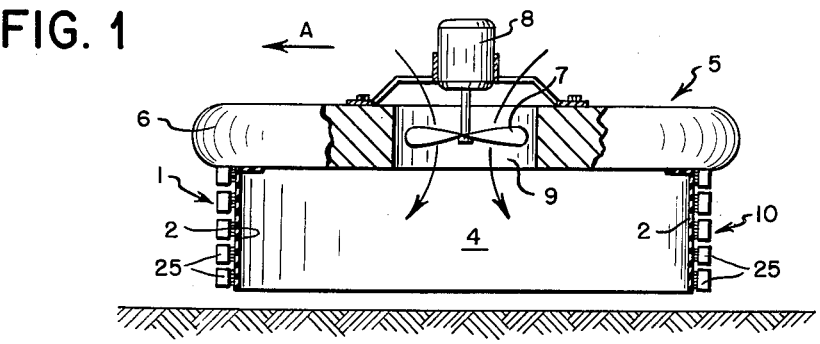
FIGURE 1 is a digrammatic elevational view partly broken away and partly in section showing an air cushion borne vehicle according to the invention in which one form of skirt is illustrated.

The vehicle 5 illustrated diagrammatically in FIGURE 1 includes a vehicle body 6 which may be of known structure and include known auxiliary equipment and features. The vehicle is provided with a jet or some other means for supplying air under a suitable pressure of the air cushion 4, such means being illustrated in the form of an impeller cated in an opening 9 in the body 6. Air may be forced 7 driven by a motor 8. As illustrated the impeller is located in the air cushion from one or more openings at the underside of the vehicle body. The air cushion 4 is encircled by a flexible skirt 10 which may be of any of the structural forms illustrated in the drawings, and which extends downwardly from the peripheral part of the underside of the vehicle body 6 so as to completely encircle the air cushion 4. In each case the skirt is formed of discrete flexible members 1 secured to a continuous flexible member 2. The members 1 are on the outside of the members 2. The flexible member 2 prevents leakage of air between the members 1 when they deflect upon the lower edge of the skirt 10 encountering the ground or the water over which the vehicle travels. The intended direction of travel of each vehicle shown in the drawings is indicated by the arrows A.

Figure 2:
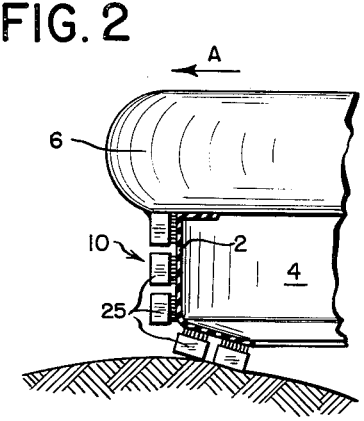
FIGURE 2 is a diagrammatic broken elevational view of a portion of the vehicle shown in FIGURE 1 illustrating a portion of the skirt of FIGURE 1 in a different operative position.

The form of skirt 10 illustrated in FIGURE 1 is comprised of a plurality of upwardly-extending members 1, the upper ends of which are secured at intervals around the peripheral part of the underside of the vehicle body. Specifically each member 1 consists of a plurality of sections 25 disposed one above the other, each section being secured to a continuous flexible member 2 which extends all around the hole of the peripheral part of the underside of the vehicle body and is secured thereto. When a skirt formed in this way encounters waves over which the vehicle is traveling, it deflects as illustrated in FIGURE 2. The flexible member 2 is so formed that the hinges which it provides between adjacent sub-section 25 increase in stiffness from tip to root of the skirt.

The skirt of FIGURES 3 and 4 is composed of a plurality of discrete flexible members 1 the upper ends of which are secured at intervals around the peripheral part of the underside of the vehicle. Each member 1 is of rectangular cross-section and is divided vertically into two parts 1A and 1B, a continuous flexible member 2 being secured between the two parts 1A and 1B of each member 1. The member 2 is continuous around the whole of the peripheral part of the underside of the vehicle. With the members 1 and 2 hanging in their natural state from the underside of the vehicle an upright fold 3 in the member 2 exists between adjacent members 1. By "upright" fold is meant a fold having an upright fold line or lines. The members 1 are much stiffer than the member 2. The member 2 is made, for example, of rubber whereas the members 1 are, for example, of nylon, or of rubber with steel reinforcing rods therein, or of laminated steel. When during motion of the vehicle the skirt encounters an obstruction, one or more of the members 1 is displaced laterally relative to the other members 1, as illustrated, for example, in FIGURE 4 where the spacing between two adjacent members 1 is shown to be increased. The member 2 becomes unfolded between the two spaced members 1 of FIGURE 4.

It will be understood that the relatively stiff flexible members 1 serve for withstanding the maximum cushion pressure to maintain the skirt approximately upright whilst the flexible member 2 serves for preventing leakage of air from the cushion between adjacent members 1, both when deflected by an obstruction and when not so deflected.

FIGURES 5 and 6 show a modified form of skirt in which the flexible members 1 have the flexible member 2 secured to their faces 1C, the members 1 in this example being of trapezoidal cross-section. FIGURE 5 shows part of the skirt in its normal condition whereas FIGURE 6 illustrates a slight deflection of the skirt.

FIGURE 7 illustrates a vehicle in which the bottom portion 31 of the skirt 10 is inclined so that it extends downwardly and inwardly into the air cushion 4. This has the effect of impeding leakage of air from the cushion 4 beneath the skirt.

FIGURE 8 illustrates a form of skirt construction in which the flexible members 1' and the continuous flexible connecting or supporting member is made of the same material and formed integrally so that the flexible members 1' are spaced apart and connected by alternately arranged loop type webs 20 extending the height of the members 1' and connected to the bottom of the vehicle body along with the flexible members.

FIGURES 9, 10 and 11 illustrate a construction generally similar to that illustrated in FIGURE 3 in which the flexible members 1 are secured to one surface of the member 2 as in FIGURE 5, but in which each member 1 has a cross-section which varies along its length, as illustrated in FIGURE 9. The cross-section of the members 1 may be chosen, for example, to permit appreciable bending to occur at some point other than the root of the member 1 or as well as at the root. Furthermore the cross-section may vary progressively along the length of the member 1, as illustrated in FIGURES 9, 10 and 11, the member 1 having a front to rear dimension or a thickness that is greatest at the top of the member 1 and least at the bottom thereof. The members 1 may be so shaped that there is a sudden decrease of stiffness at large deflections so that the members 1 buckle when deflected beyond a certain amount. This can be achieved by making the members 1 with closed hollow cross-sections of circular form, the wall thicknesses of which are constant as illustrated in FIGURE 12 or variable as illustrated in FIGURE 13 in which the outer wall of the hollow member 1 is thicker than the inner wall attached to the member 2. FIGURES 14 and 15 illustrate the buckled condition of a hollow member 1 of the type illustrated in the skirt section shown in FIGURE 12. Where hollow members 1 are employed, they are inflated as indicated by the radially outwardly-extending arrows in FIGURES 12 and 13.

FIGURES 16 and 17 illustrate a further modified construction in the use of hollow members 1 secured to the member 2, in which a rod 32 is used to reinforce the members 1 and may be placed inside the cavity of the hollow member 1 whereby upon buckling, the member 1 will only partially collapse and very high stresses which would be associated with high curvatures occurring at the edges of a flattened hollow section are substantially avoided.

Reverting to the arrangement illustrated in FIGURE 13, flexible members 1 having the shape illustrated in this figure cause the stiffness of the skirt to be different in different directions. These members 1 are at the front of the craft and have hollow sections with the wall thicknesses at the front greater than those at the rear of the section so that the members 1 will collapse more readily when deflected backwardly than when deflected forwardly and thus the skirt at the front of the vehicle provides a relatively high stiffness to oppose cushion pressure but low stiffness when encountering waves or obstacles.

We claim:
1. A vehicle having a vehicle body adapted to receive support from an air cushion from which lateral escape of air is minimised by a flexible skirt depending from the underside of a peripheral part of the vehicle body, wherein the skirt comprises a plurality of discrete first members depending from the underside of said peripheral part, a second member effectively joining together adjacent first members, the skirt being continuous along said peripheral part, and the second member in the natural condition of the skirt including an upright fold between adjacent first members.

2. A vehicle as claimed in claim 1, wherein the first members are integral with the second member.

3. A vehicle as claimed in claim 1, wherein the first members are on the outside of the skirt.

4. A vehicle as claimed in claim 1, wherein first members are employed that are hollow inflated flexible members.

5. A vehicle as claimed in claim 4, wherein an element is disposed inside the cavity of each hollow member whereby upon buckling of these members collapse beyond a certain amount is impeded by said elements.

6. A vehicle as claimed in claim 1, wherein first members are employed that each have a cross-section which varies along the length of the member.

7. A vehicle as claimed in claim 6, wherein first members are employed that are shaped to permit appreciable bending thereof to occur at some particular point along the length thereof.

8. A vehicle as claimed in claim 1, wherein first members are employed that are shaped to cause a sudden decrease in stiffness thereof to occur at large deflections so that these members buckle when deflected beyond a certain amount.

9. A vehicle as claimed in claim 1, wherein first members are employed that have a stiffness that is different in different directions, the arrangement being such that the first members collapse more readily when the lower ends thereof are deflected into the cushion than when they are deflected away from the cushion.

10. A vehicle as claimed in claim 1, wherein the bottom portion of the skirt is inclined so that is extends downwardly and inwardly into the cushion thereby to impede leakage of air from the cushion beneath the skirt.

References Cited by the Examiner
UNITED STATES PATENTS

| | | | |
|---|---|---|---|
| 3,027,860 | 4/1962 | Priest | 114—67 |
| 3,172,494 | 3/1965 | Cockerell | 180—7 |

FOREIGN PATENTS

| | | |
|---|---|---|
| 860,781 | 2/1961 | Great Britain. |

MILTON BUCHLER, *Primary Examiner.*

PHILIP ARNOLD, A. HARRY LEVY, *Examiners.*

UNITED STATES PATENT OFFICE
CERTIFICATE OF CORRECTION

Patent No. 3,219,135                      November 23, 1965

Wilfred Henry Bunting et al.

It is hereby certified that error appears in the above numbered patent requiring correction and that the said Letters Patent should read as corrected below.

Column 2, line 14, for "of" read -- to --; lines 16 and 17, strike out "cated in an opening 9 in the body 6. Air may be forced 7 driven by a motor 8. As illustrated the impeller is lo-" and insert instead -- 7 driven by a motor 8. As illustrated the impeller is located in an opening 9 in the body 6. Air may be forced --.

Signed and sealed this 6th day of December 1966.

(SEAL)
Attest:

ERNEST W. SWIDER                      EDWARD J. BRENNER
Attesting Officer                      Commissioner of Patents